United States Patent [19]

Listov et al.

[11] 3,945,179
[45] Mar. 23, 1976

[54] COTTON PICKUP

[76] Inventors: Petr Nikolaevich Listov, Krasnostudenchesky proezd, 11, kv. 16, Moscow; Madzhid Saidovich Ganiev, ulitsa Tsentralnaya, 8, p/o Kirda, Tashkentskaya oblast; Vladimir Ivanovich Buromsky, ulitsa Kuusinena, 7, kv. 159; Lidia Ivanovna Bogdanova, ulitsa Yasnopolyanskaya 6, kv. 4, both of Moscow; Enver Tefikovich Kalafatov, M. Severo-Vostok, 67, kv. 2, Tashkent; Dmitry Nikolaevich Topalidi, ulitsa Veshnevaya 10, p/o Kirda, Tashkentskaya oblast; Vitaly Petrovich Rodionov, ulitsa Vereschagina, 141, kv. 10, Alma-Ata; Edem Idrisovich Junusov, ulitsa Tsentralnaya, 10, Syr-Darinskaya oblast; Valery Pavlovich Fedorov, ulitsa kirova, 12, Alma-Ata, all of U.S.S.R.

[22] Filed: Mar. 31, 1975

[21] Appl. No.: 563,384

[52] U.S. Cl. .................................................. 56/28
[51] Int. Cl.² .......................................... A01D 45/18
[58] Field of Search ........ 56/328 R, 28, 1, 49, 16.7, 56/42

[56] References Cited
UNITED STATES PATENTS

| 103,986 | 6/1870 | Cooke | 56/49 |
| 602,076 | 4/1898 | Hamerschlag et al. | 56/16.7 |
| 1,650,796 | 11/1927 | Kellogg | 56/328 R |
| 2,837,886 | 6/1958 | Beach et al. | 56/42 |
| 3,108,418 | 10/1963 | Henderson | 56/28 |
| 3,143,841 | 8/1964 | Kirtland | 56/28 |
| 3,324,640 | 6/1967 | Attebery | 56/28 |

FOREIGN PATENTS OR APPLICATIONS

| 122,981 | 6/1959 | U.S.S.R. | 56/28 |

Primary Examiner—Russell R. Kinsey
Attorney, Agent, or Firm—Fleit & Jacobson

[57] ABSTRACT

The cotton pickup comprising a self-propelled frame having a rotary gripping means mounted thereon and including a dielectric pressurized cylinder being rotated by a drive and having a plurality of teeth on the outer surface thereof for gathering and retaining the waste cotton, said pressurized cylinder having an electric charge source mounted therewithin and imparting the electric charges to the pressurized cylinder inner surface. The pressurized cylinder wall thickness is selected so that the electric field produced under the action of the charges between the ground and the pressurized cylinder outer surface, is capable of attracting the cotton to the pressurized cylinder outer surface from where it is doffed by a brush means and transported into a collecting tank by a transporting means.

3 Claims, 3 Drawing Figures

COTTON PICKUP

The present invention relates to agricultural machinery and more specifically to cotton pickups employed for picking up cotton that has fallen to the ground during harvesting.

When cotton is machined, a considerable amount of cotton bolls are knocked off and onto the ground. Desirably, the waste cotton should be picked up within the shortest time possible at minimum labour costs.

The machines used for cotton harvesting should provide for effective recovery of waste cotton.

It is known to use mechanical pickups of a notched-belt type to pick up the cotton from the ground.

The prior art cotton pickup of this type comprises a continuous or endless conveyor rubber belt having transverse notches on the outer surface thereof and pulled over a driving and a driven pulleys mounted on the cotton pickup frame.

In order to bring the cotton from under the plants into the range of the conveyor rubber belt operation, use is made of sweeping or scraping brushes mounted in front of the self-propelled frame so that the direction of their motion is substantially normal to the direction of the continuous conveyer rubber belt movement.

The operation of such pickups is based on gripping the cotton by the rubber belt. When the rubber belt is bent out round the driven pulley contacting the ground surface, the transverse notches are opened and the cotton from the ground gets into the openings therebetween. After passing the driven pulley, the notches close. The cotton thus gripped is conveyed and, when the rubber belt notches open on reaching the driving pulley, it is discharged into a hopper or onto another conveyer arranged thereunder.

In order to follow the row width profile as closely as possible, the rubber belt is made of separate sections throughout the entire row width spacing.

One disadvantage of such prior art notched-belt cotton pickups is their inability to gather all cotton from the ground, since part of waste cotton will not get into the openings of the rubber belt transverse notches. Another disadvantage is that the recovered cotton is excessively soiled, inasmuch as the rubber belt grips the soil and leaves therewith. Besides, the construction of such cotton pickups is cumbersome and complex, because the conveyor rubber belt should closely follow the row width profile. The rubber belts, due to the presence of the transverse notches and considerable length thereof, are unreliable in operation.

Also known are electrostatic cotton pickups. Such a cotton pickup comprises an inflatable rubber cylinder having a nappy material at the outer surface thereof. When the cylinder is rolled along the row, the nappy surface layer of the rubber cylinder is charged with static electricity due the friction against the ground. The cotton is picked up by the forces of the electrical interaction between the oppositely charged cylinder surface layer and cotton particles. To follow the row width profile more closely, a comparatively low pressure is set inside the cylinder.

The essential advantage of the electrostatic pickup resides in the simplicity of its construction.

However, this prior art electrostatic cotton pickup has a number of disadvantages. While the rubber cylinder surface layer is being charged with static electricity in the process of its friction against the ground, a significant portion of the charges will leak to the ground, since the cylinder is continuously contacting the ground. Furthermore, the dust always existing between the cylinder surface and the ground will cancel cut some charges on the cylinder. The cylinder nappy material is easily torn out during its friction against the ground, since the forces of cohesion between the cotton and the ground exceed the attraction forces between the cotton and the nappy material and the cotton is slipping past the rotating cylinder surface unattracted thereto.

It is an object of the present invention to produce such an electric field within the cotton pickup that will ensure the attraction of the cotton at a distance from the pressurized cylinder.

It is another object of the present invention to provide a cotton pickup having a simpler construction and being more reliable in operation.

These and other objects and advantages of the invention are attained in a cotton pickup comprising a rotary gripping means mounted on a self-propelled frame and including a pressurized cylinder made of a dielectric material and producing an electric field for attracting the waste cotton and transferring in into a collecting tank, wherein according to the invention, source of electric charges is fixedly mounted within said pressurized cylinder, said source imparting the charges to the inner surface of said pressurized cylinder, said pressurized cylinder having its wall thickness selected so that the electric field produced under the action of said charges between the ground and the outer surface of said cylinder is capable of attracting the cotton to said pressurized cylinder outer surface having a plurality teeth thereat for retaining the cotton and transferring it to said collecting tank.

Preferably, a means for collecting the cotton from the ground and conveying it into the pressurized cylinder effecting electric field zone is provided in front of the pressurized cylinder when viewed the direction of the self-propelled frame travel, said means being made in the form of a drum having a plurality of elastic fingers suitably arranged on the outer surface thereof.

Futhermore, the drum is advantageously equipped with an air ionizing means imparting the electric charges to the cotton on its way to the pressurized cylinder effective electric field, said charges imparted to the cotton being opposite in sign to those of the pressurized cylinder outer surface.

Embodying the rotary gripping means in the form of a pressurized cylinder having an electric charge source mounting fixedly therewithin permits the concentration of the charges on the pressurized cylinder inner surface whereby their leakage to the ground is prevented when the pressurized cylinder contacts the ground or cotton. Owing to the selection of the right pressurized cylinder material, thickness and configuration of the electrodes of the electric charge source, a strong non-uniform electric field is produced between the outer surface of the pressurized cylinder and the ground, thereby ensuring the attraction of the cotton at distances between the pressurized cylinder and the ground varying from 0 to 70 millimeters.

The present invention utilizes a pressurized cylinder whose profile is substantially identical to the average row width profile, whereby the need for the pressurized cylinder to closely follow the row width microrelief is eliminated.

Moreover, it is made possible to arrange the pressurized cylinder above the ground surface at the distance of 30 to 50 millimeters.

The arrangement of the pressurized cylinders above the ground level also permits their positive rotation in the desired direction at a preset speed and prevents their wear-out due to friction against the ground.

By mounting the electric charge source in a fixed position within the rotary pressurized cylinder it is possible to concentrate the electric field solely in the desired area of the pressurized cylinder and namely in the cotton attraction zone. This results in the reduction of the electric power consumed by the electric charge source down to 30 watts per row, since the power is used only for charging the pressurized cylinder.

The cotton pickup may be installed both on a cotton harvesting machine and on an independent self-propelled unit.

When the cotton pickup is installed directly on a cotton harvesting machine, the pressurized cylinder having an electric charge source arranged therein is suspended behind the picker to pick up the cotton from the ground immediately after it has fallen to the ground.

When using the cotton pickup as an independent machine, a drum should be mounted in front of the pressurized cylinder when viewed in the direction of the self-propelled frame travel to collect and convey the cotton into the pressurized cylinder effective electric field zone.

The drum will break up the cohesion between the cotton and the ground and enable the waste cotton recovery to be effected under severe conditions.

Since the cotton gathered within the row width is charged by an ionizing means and the charge sign is opposite to that of the pressurized cylinder charge, more effective recovery of the waste cotton may be attained.

The present cotton pickup is simpler in construction, more reliable in operation and guarantees the electrical safety due to the use of small currents.

The invention will now be described in greater detail with due to reference to the accompanying drawings, wherein.

The cotton pickup may be installed directly on cotton harvesting machines and on independent self-propelled units.

Figure 1:
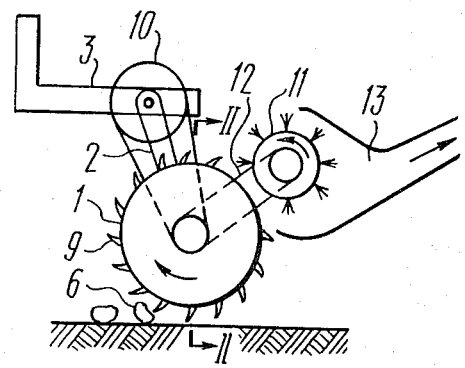
FIG. 1 shows a cotton pickup installed on a cotton harvesting machine.

The cotton pickup installed on a cotton harvessting machine comprises a pressurized cylinder 1 (FIG. 1) of a dielectric material mounted on a frame 3 by means of a link 2 behind the machine pickers (the place where the frame 3 is fastened to the pickers is not shown in FIG. 1).

A source 4 of electric charges (FIG. 2) is rigidly fixed on insulated axle shafts 5 inside the pressurized cylinder 1. This electric charge source 4 provides for the concentration of the electric charge on the inner surface of the pressurized cylinder whereby an electric field is produced outside the pressurized cylinder for attracting the waste cotton.

One of the axle shafts 5 has a bore 7 for passing a cable 8 therethrough.

The outer surface of the pressurized cylinder 1 has a plurality of teeth 9 (FIG. 1) for retaining cotton 6 being attracted.

The attracted cotton 6 is conveyed into the doffing zone by the pressurized cylinder 1 rotated by a drive 10 which is coupled with the cotton harvesting machine drive mechanism (not shown).

To remove the cotton 6 off the pressurized cylinder 1 use is made of a brush means 11 kinematically coupled with the pressurized cylinder 1 by means of a bet drive 12. From the brush means 11, the cotton 6 falls into the inlet of a pneumatic conveying duct 13 and is transported into a collecting tank (not shown).

To push the cotton plants 14 (FIG. 2) aside during picking up and thus protect the pressurized cylinder 1 and its drive 10 from any possible mechanical damage, plates 15 are provided outside the link 2.

The cable 8 connecting the electric charge souce 4 to a high-voltage supply (not shown) is fastened at the inner side of the link 2. Corona electrodes may be used as the source 4 of electric charges.

The pressurized cylinder 1 covers the entire spacing between rows of plants 15 and the cylinder shape essentially corresponds to the average profile of the furrow between said rows of plants.

By mounting the electric charge source 4 in a fixed position inside the pressurized cylinder 1, it is possible to concentrate the electric charges at the inner surface thereof and prevent their leakage to the ground because of the high electric resistance of the pressurized cylinder material. Because of a this, a strong non-uniform electric field is produced between the pressurized cylinder 1 and the ground whereby the cotton may be effectively oriented and attracted by the cylinder 1 mounted at some distance from the ground. This provides for substantially enhancing the cotton pickup operational reliability and service life.

The distance between the pressurized cylinder 1 and the ground depends upon the potential (30 to 50 kilovolts) of the electric charge source 4 and is variable from 0 to 70 millimeters.

The charging currents of the dielectric pressurized cylinder 1 vary with the material and its thickness and reach the value of 30 to 1000 microamperes which is considered harmless to the organism of man.

The pressurized cylinder may be made of any plastic material, e.g. polyurethane.

When the cotton pickup is mounted on a cotton harvesting machine, the pressurized cylinder 1 is arranged behind the pickers at such a distance that the cotton dropped down by the pickers falls into the effective electric field zone in front of the pressurized cylinder 1.

The operation of the cotton pickup is as follows.

During operation of the cotton harvesting machine, the drive 10 (FIG. 1) coupled with picker drive mechanism (not shown) starts rotating the pressurized cylinder 1, and thence the brush means 11 is driven by means of a belt drive 12. Simultaneously, the picker drive mechanism starts the blower not shown, for inducing suction in duct 13.

When the electric charge source 4 (FIG. 2) is energized, the charges begin to accumulate on the inner wall of the pressurized cylinder 1, thus producing a non-uniform electrostatic field between the pressurized cylinder 1 and the ground.

The cotton particles falling into the effective electrostatic zone are oriented and then attracted to the pressurized cylinder 1 both due to the non-homogeneousness of the electric field and the forces of electric interaction between the oppositely charged cotton 6 (FIG. 1) and pressurized cylinder 1.

The oriented and attracted cotton 6 is gripped by the teeth 9 during the pressurized cylinder rotation and conveyed into the doffing zone where the cotton is doffed by the brush means 11 and directed into the duct 13 transporting it into the collecting tank.

The teeth 9 of the pressurized cylinder 1 ensure the reliable retention and gripping of the cotton 6 attracted to the pressurized cylinder 1.

Figure 3:
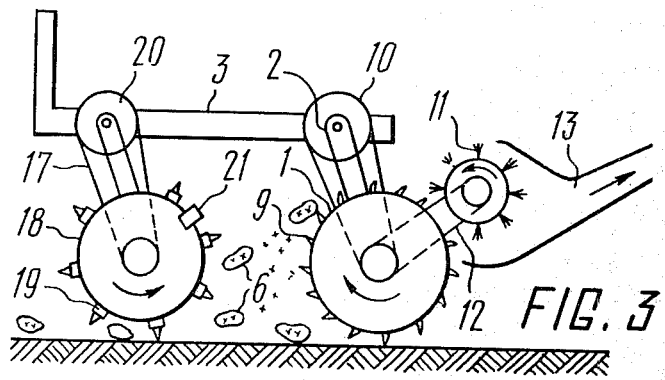
FIG. 3 is a view showing the arrangement of the cotton pickup on a self-propelled frame.

When the cotton pickup is used as an independent unit, a cotton collecting means comprising a drum 18 (FIG. 3) having a plurality of elastic fingers 19 at the outer surface thereof is mounted on a self-propelled frame in front of the pressurized cylinder 1 by means of a link 17.

The drum 18 is rotated by a drive 20 coupled with the self-propelled frame drive mechanism.

In order to impart an electric charge to the cotton 6 an air ionizng means 21 is mounted on the surface of the drum 18. This ionizing means generates charges whose sign is opposite to that of the charge on the inner wall of the pressurized cylinder 1.

The operation of the independent cotton pickup is as follows.

Figure 2:
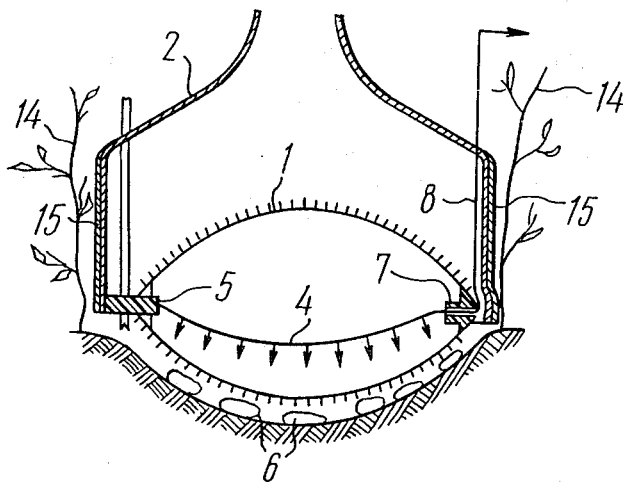
FIG. 2 is a sectional view taken along II—II of FIG. 1.

The drives 10 and 20 are started and the pressurized cylinder 1 and the drum 18 begin rotating. The fingers 19 of the drum 18 handle the cotton 6 and transfer it into the effective electrostatic field zone at the pressurized cylinder 1. At the same time, the cotton 6 is charged by the air ionizing means 21 so that its sign is opposite to that of the pressurized cylinder 1 charged by the electric charge source 4 (FIG. 2). Due to the interaction between charged cotton particles 6 (FIG. 3) and the oppositely charged surface of the pressurized cylinder 1, the cotton particles are oriented and attracted to the pressurized cylinder 1. While rotating, the pressurized cylinder 1 grips the attracted cotton with the teeth 9 and conveys it into the doffing zone. The small pieces of dirt and dust resulting from the operation of the drum 18 slip through the gaps between the teeth 9 and settle down on the outer surface of the pressurized cylinder 1.

The cotton is doffed from the pressurized cylinder 1 by the rotary brush means 11 and directed into the blower 13 which transports it into the collecting tank.

Although the cotton pickup according to the invention has been described and shown as having a single pressurized cylinder 1, the quantity of the pressurized cylinders 1 may be advantageously increased to any desired number in order to improve the waste cotton recovery and operating efficiency in the case of both the independent unit and the cotton harvesting machine incorporating the cotton pickup according to the invention. For example, two or more such pressurized cylinders may be mounted in a series succession.

The cotton pickup made in accordance with invention provides for 80 to 85% recovery of the waste cotton per a single pass, and the operating efficiency of the cotton pickup may be further improved by using a multirow arrangement.

What is claimed is:

1. A cotton pickup comprising: a self-propelled frame; a rotary gripping means arranged on said self-propelled frame and including a dielectric pressurized cylinder having a plurality of teeth on the outer surface thereof for gripping the cotton; a source of electric charges mounted in a fixed position within said pressurized cylinder and imparting the charges to the inner surface of said pressurized cylinder; said pressurized cylinder having a wall whose thickness is selected so that under the action of the charges generated by said electric charge source an electric field capable of attracting the cotton to the outer surface of said pressurized cylinder is produced outside said pressurized cylinder between it and the ground; a doffing means arranged in close vicinity to said pressurized cylinder for removing the cotton from said pressurized cylinder; a transporting means arranged under said doffing means and effecting the transportation of the waste cotton into a collecting tank.

2. A cotton pickup as set forth in claim 1, wherein a means for picking up cotton from the ground and transferring it into the effective electric field zone of said pressurized cylinder is arranged in front of said pressurized cylinder when viewed in the direction of travel of said self-propelled frame, said collecting means being made in the form of a drum having a plurality of elastic fingers at the outer surface thereof.

3. A cotton pickup as set forth in claim 2, wherein said drum has an air ionizing means mounted thereon, said ionizing means imparting electric charges to the cotton on its way towards the electric field of said pressurized cylinder, the sign of said cotton charges being opposite to that of the charge of said pressurized cylinder.

* * * * *